March 16, 1965    W. A. ROBERTS    3,173,228
GABLE GLAZING BAR CAP
Filed March 12, 1962
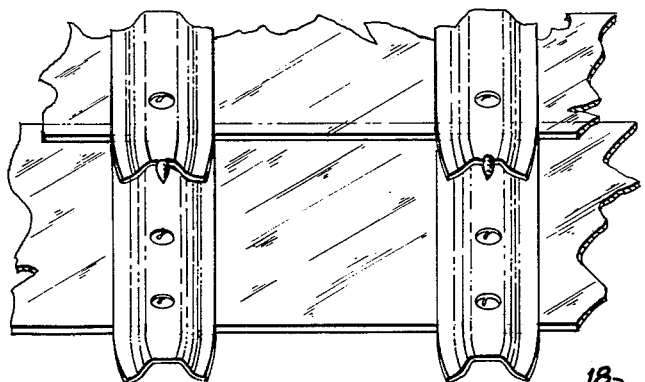
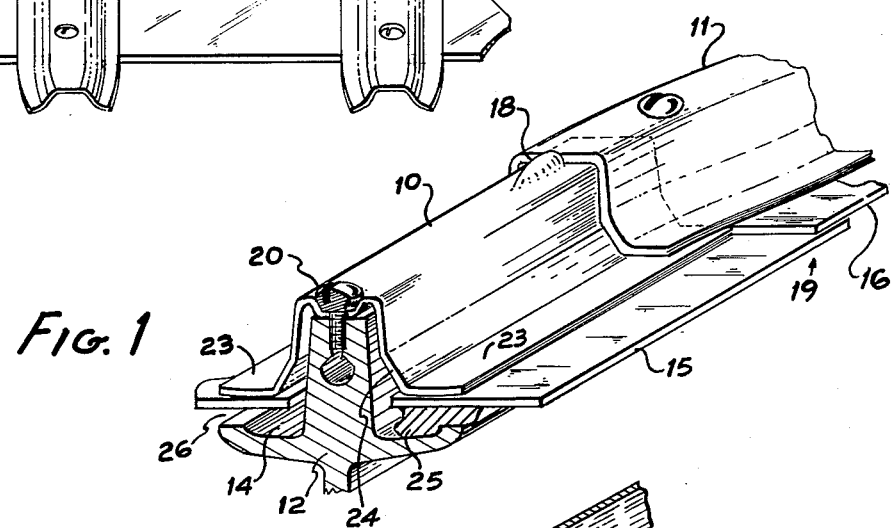
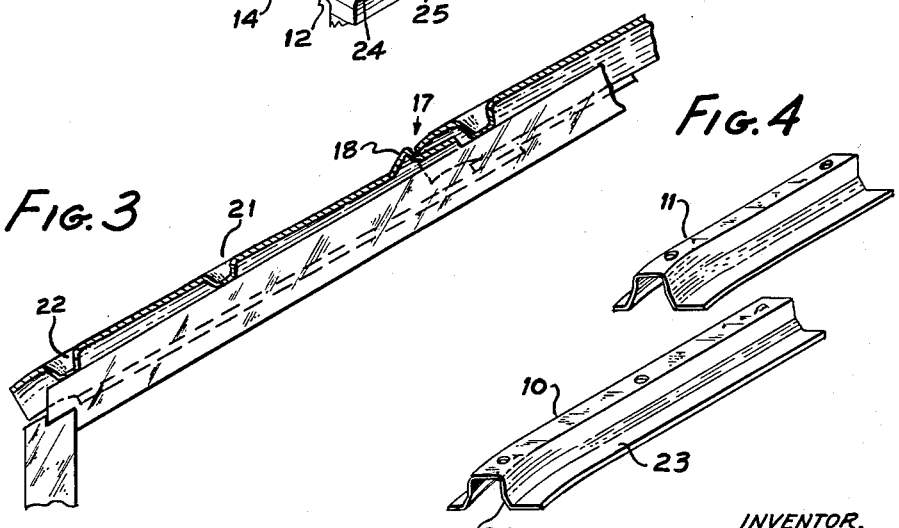
INVENTOR.
WILLIAM A. ROBERTS
BY
John H. Glaccum
ATTORNEY United States Patent Office 3,173,228
Patented Mar. 16, 1965

3,173,228
GABLE GLAZING BAR CAP
William A. Roberts, Hartsdale, N.Y., assignor to Burnham Corporation, Irvington, N.Y., a corporation of New York
Filed Mar. 12, 1962, Ser. No. 178,971
1 Claim. (Cl. 50—205)

An object of this invention is to provide a bar cap that will perform a number of functions with a multiplicity of different units. In the past bar caps, because of their design and construction, have had a tendency to exert pressure only at the fastening points.

Accordingly it is an object of this invention to provide a bar cap that will provide uniform pressure over the entire surface of the glass rather than at specific points.

A further object of the invention is to provide a bar cap that will have a certain amount of resiliency in order to take care of small discrepancies on the surface and thus insure uniform pressure throughout the length of the cap.

A still further object is to provide a structure in which it will be impossible to screw down the cap to a point where the glazing compound is squeezed out from under the glass to a point where the glass rests directly on the glazing bar. This causes erosion of the glass particularly on aluminum bars.

Still another object of the invention is to provide a bar cap that will compensate for the surface taper caused by the overlapping of the glass panels, since this is not constant, the compensation must be adjustable.

Other objects and advantages of this invention will be apparent from the accompanying drawings and description in which—

FIG. 1 is a sectional view in perspective showing the manner in which the caps are mounted on the roof bars.

FIG. 2 is a sectional elevation of bar caps in place on a greenhouse.

FIG. 3 is a cross-sectional view of a roof bar showing the caps mounted thereon.

FIG. 4 is a detailed view in perspective showing a pair of caps.

Referring more particularly to the drawings, there is shown a pair of the improved bar caps 10 and 11 mounted on a roof bar 12 having the condensation gutters 14. The caps 10 and 11 help position the panels of glass 15 and 16 in place and seal their junction from the weather. The panels 15 and 16 overlap at 19 and the bar caps at 17. A raised portion or nob 18 is provided on each cap to abut the overlapping cap to insure its proper positioning. Each cap is held in place on the roof bar 12 by means of two screws 20 which are seated in the counter sunk screw holes 21 and 22. The counter sunk screw hole 22 is deeper than 21 to allow for the taper of the glass.

In the past aluminum bar caps have been so constructed that the edge of the cap contacted the glass and did not provide any resiliency. The improved cap is splayed outwardly at its side 24 and the flange 23 rests flat upon the glass to provide the needed resiliency to take care of small discrepancies on the surface.

It will be appreciated that because it is impossible to screw the cap 10 down beyond the top of the roof bar because of the counter sunk portions 21 and 22 that there will always be a small space 26 filled with glazing compound 25 between the glass and the roof bar so that the glass never rests directly on the roof bar but rather on a cushion of glazing compound.

It will also be appreciated that the seal will be tight because the cap is resilient enough in its sides 24 and the extensions thereof 23 to compensate for any discrepancies in the surface. Furthermore the taper of the glass due to overlapping is compensated by the difference in depth of the counter sunk portions 21 and 22.

I claim:

A roof construction comprising glass panels supported on their edges in end overlapping relationship on parallel roof bars, a plurality of elongated roof caps lying above and parallel to said roof bars, covering and positioning the supported edges of said glass panels, each cap being substantially the same length as a panel of glass, contiguous ends of said caps being in overlapped relationship, each cap having a generally hat-shaped cross section with spaced depressions along the length in the crown portion thereof, said depressions uniformly varying in depth along the length of the cap, said depressions spacing the cap member a varying and predetermined distance from the roof bar and accommodating the angularly related surfaces of the glass panels, fasteners passing through apertures in the depressions and engaging said roof bars, said fasteners clamping said caps and glass panels to said roof bars.

References Cited by the Examiner
UNITED STATES PATENTS 2,485,455  1/49  Wilson _____ 50—66
2,557,660  6/51  Jacobs _____ 50—203
2,901,785  9/59  Hinchliffe et al. _____ 20—56.4

HENRY C. SUTHERLAND, Primary Examiner.

WILLIAM I. MUSHAKE, JACOB L. NACKENOFF, Examiners.